United States Patent [19]

Gillund

[11] Patent Number: 5,117,620

[45] Date of Patent: Jun. 2, 1992

[54] DETACHABLE KNIFE ASSEMBLY FOR A FLAIL MACHINE

[75] Inventor: Ronald D. Gillund, Cary, Ill.

[73] Assignee: Mathews Company, Crystal Lake, Ill.

[21] Appl. No.: 653,763

[22] Filed: Feb. 11, 1991

[51] Int. Cl.⁵ .......................................... A01D 50/02
[52] U.S. Cl. .................................... 56/504; 56/289;
56/DIG. 17; 460/112; 460/122; 172/45
[58] Field of Search ................ 56/289, 500, 504, 505,
56/DIG. 9, DIG. 17, DIG. 20; 460/112, 113, 122, 121; 172/45

[56] References Cited

U.S. PATENT DOCUMENTS

| | | | |
|---|---|---|---|
| 3,043,080 | 7/1962 | Mott | 56/504 |
| 3,050,927 | 8/1962 | Markham et al. | 56/504 |
| 3,092,946 | 6/1963 | Mathews | 56/192 X |
| 3,190,064 | 6/1965 | Wenzel et al. | 172/45 |

Primary Examiner—Terry Lee Melius
Attorney, Agent, or Firm—Speckman & Pauley

[57] ABSTRACT

A detachable knife assembly having a hanger bracket forming a curved end. The curved end defines an opening large enough to fit the curved end of the hanger bracket over a mounted hanger rod. A retaining bracket is positioned adjacent the hanger bracket and close enough to the curved end of the hanger bracket to enclose and retain the hanger rod within the hanger bracket opening. A knife blade is either a part of or secured to the hanger bracket. The retaining bracket is detachably secured to the hanger bracket. The curved end of the hanger bracket preferably forms a curve about an arc segment of approximately 180°.

23 Claims, 2 Drawing Sheets

DETACHABLE KNIFE ASSEMBLY FOR A FLAIL MACHINE

BACKGROUND OF THE INVENTION

1. Field of the Invention

This invention relates to a knife assembly, particularly suitable for a flail apparatus, for mowing or shredding agricultural crop residue and for industrial and commercial mowing or the like, which can be easily replaced in the field without requiring removal of a hanger rod on which it is mounted.

2. Description of Prior Art

Existing flail apparatuses have various rotor designs which incorporate knife elements typically having a hanger bracket with a completely closed or nearly closed curved end which forms an opening through which a hanger rod is mounted. Such conventional curved ends are curved about an arc segment of at least 270°, so that the hanger rod must be threaded through the opening in order to retain the knife element in a mounted position on the hanger rod. U.S. Pat. No. 3,092,946 discloses a conventional knife element arrangement.

With the closed or nearly closed curved end arrangement of conventional knife elements, each knife element can be mounted on the hanger rod so that the knife element swings with respect to the hanger rod, or pivots about a longitudinal axis of the hanger rod. To install such conventional knife elements, the hanger rod must be threaded through the opening formed at the curved end of each hanger bracket. Quite often, the hanger rods are relatively long, for example, 15 to 30 feet long. Each hanger rod of such length is often used to mount multiple knife elements.

During operation, hanger brackets of the knife elements can be damaged, for example when the knife element strikes a rock or other relatively hard substance or obstruction. Because the hanger rods are continuous or integral pieces, replacement of a damaged hanger bracket may require removal of the entire hanger rod from its mounted position on the rotor, depending upon the position of the damaged hanger bracket. It is apparent that field maintenance and installation procedures are quite cumbersome and time-consuming, particularly due to the inaccessibility of the rotor as well as ground conditions normally associated with field operations. As the hanger rod is withdrawn from its mounted position on the rotor, the conventional knife elements are dismounted or disassembled with respect to the rotor. Because each individual conventional knife element must be held in position as the relatively long hanger rod is pushed or shoved into its mounted and assembled position, two persons are required to assemble the conventional knife elements in their mounted position, with respect to the rotor.

Thus, a need exists for a detachable knife element which can be easily and readily replaced in the field, by one person, without requiring complete or even partial removal of the hanger rod with respect to the rotor.

SUMMARY OF THE INVENTION

It is one object of this invention to provide a detachable knife assembly which can be attached to and detached from a hanger rod, by one person, without requiring removal of the hanger rod from its mounted position on a rotor.

It is another object of this invention to provide a detachable knife assembly in which a knife blade can be removed from a hanger bracket, without removing the hanger bracket from its mounted position on the hanger rod.

The above objects of this invention are accomplished with a knife assembly that includes a hanger bracket which forms a curved end. The curved end defines an opening which is large enough to enable the hanger bracket to be positioned over the hanger rod, and thus the hanger rod does not have to be threaded through the opening. In one preferred embodiment according to this invention, the curved end of the hanger bracket can be positioned over the hanger rod since the curved end forms a curve about an arc segment of approximately 180°.

The retaining bracket is positioned adjacent the hanger bracket and close enough to the curved end so that the hanger rod is enclosed and retained within the opening defined by the curved end of the hanger bracket. In one preferred embodiment according to this invention, the blade end of the hanger bracket, which is opposite the curved end, is curved in an opposite direction, with respect to the curve of the curved end. Although such arrangement is preferred, it is apparent that the blade end can also be either straight or curved in the same direction as the curved end.

A knife blade is either fixedly secured or detachably secured to the hanger bracket. It is also apparent that the knife blade and the hanger bracket can be an integral piece. In a preferred embodiment according to this invention, a retaining bracket is detachably secured to the hanger bracket. The hanger bracket, retaining bracket and knife blade are secured together and assembled in a fashion that enables the knife assembly to be positioned on the hanger rod without detaching or separating the hanger rod from its mounted position on the rotor. In other words, the knife assembly according to this invention can be attached and detached from the hanger rod, without threading, pulling or pushing the hanger rod through the opening within the hanger bracket.

If the hanger bracket is curved at the knife end of the bracket, then the knife blade is correspondingly curved to conform or mate with the hanger bracket. In one preferred embodiment according to this invention, the retaining bracket has a mounting portion positioned adjacent the hanger bracket and a bearing portion which is angled, with respect to the mounting portion, away from the hanger bracket. The retaining bracket preferably has an overall L-shaped cross section. The retaining bracket is also preferably spaced from an end edge of the curved end of the hanger bracket. Such spaced arrangement enables dirt and other foreign materials to escape through the space or opening formed between the retaining bracket and the hanger bracket.

In one preferred embodiment according to this invention, the hanger bracket, knife blade and retaining bracket each have a plurality of corresponding through holes, preferably three corresponding through holes. Such through holes are aligned so that the hanger bracket, knife blade and retaining bracket can be assembled with a plurality of nuts and bolts. The retaining bracket preferably has an enlarged through hole for wrench access or access of other tools, and also so that the knife blade can be attached to the hanger bracket before the retaining bracket is secured to the hanger bracket. The enlarged through hole also reduces the weight of the retaining bracket. The preferred three through holes are positioned along a straight line on each of the hanger bracket, knife blade and retaining bracket, in one preferred embodiment according to this invention. In another preferred embodiment, at least one of the three through holes, preferably the outer two through holes, form slots so that the position of the retaining bracket can be adjusted, with respect to the hanger bracket.

To assemble the various elements of the knife assembly according to this invention, which preferably has three through holes in each of the hanger bracket, knife element, and retaining bracket, the knife blade is first secured to the hanger bracket by inserting a bolt, preferably a carriage bolt, through the middle through hole. A nut, preferably a lock nut, is mated with the bolt to secure the knife blade with respect to the hanger bracket. Because the curved end of the hanger bracket forms an opening which is large enough to fit over the hanger rod, the hanger bracket is then positioned over the mounted hanger rod. Finally, the retaining bracket is secured to the hanger bracket with a nut and bolt positioned through each of the outer two through holes. The preferred embodiment having the adjustable arrangement of the two outer through holes enables the retaining bracket to be adjusted with respect to the end edge of the curved end of the hanger bracket, to form an appropriately sized space between the retaining bracket and the hanger bracket.

With a knife assembly according to this invention, as described above, it is possible to attach and detach the knife assembly to and from a mounted position over the hanger rod, particularly without the necessity of disassembling the hanger rod from its mounted position on the rotor. The retaining bracket, knife blade and hanger bracket arrangement of this invention also provides for a stronger and more rigid overall knife assembly, as compared to conventional knife assemblies.

BRIEF DESCRIPTION OF THE DRAWINGS

The above mentioned and other features of this invention and the manner of obtaining them will become more apparent, and the invention itself will be best understood by reference to the following description of specific embodiments taken in conjunction with the drawings, wherein.

DESCRIPTION OF PREFERRED EMBODIMENTS

Figure 1:
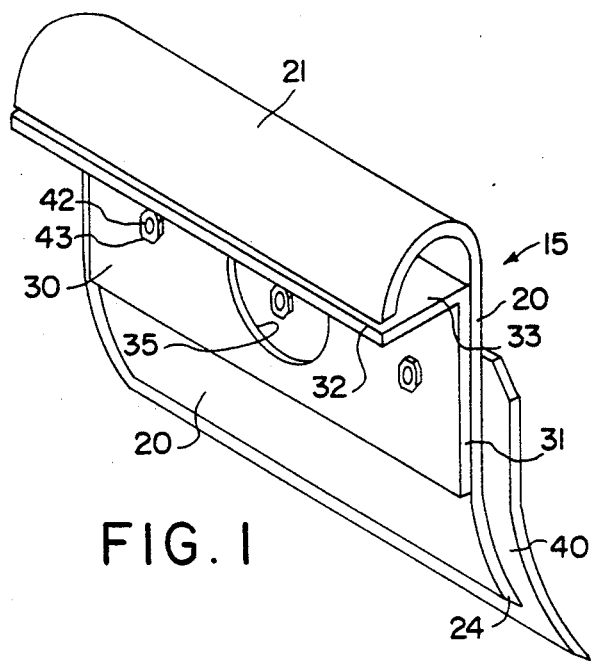
FIG. 1 is a perspective view of a knife assembly, according to one preferred embodiment of this invention.
Figure 1A:
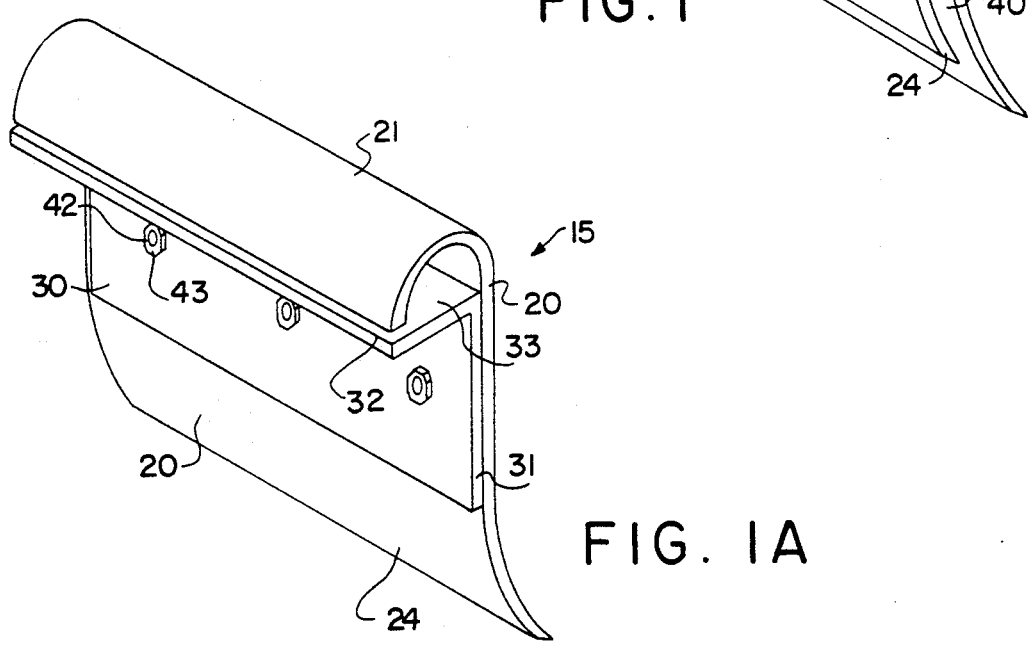
FIG. 1A is a perspective view of a knife assembly, according to another preferred embodiment of this invention.
Figure 2:
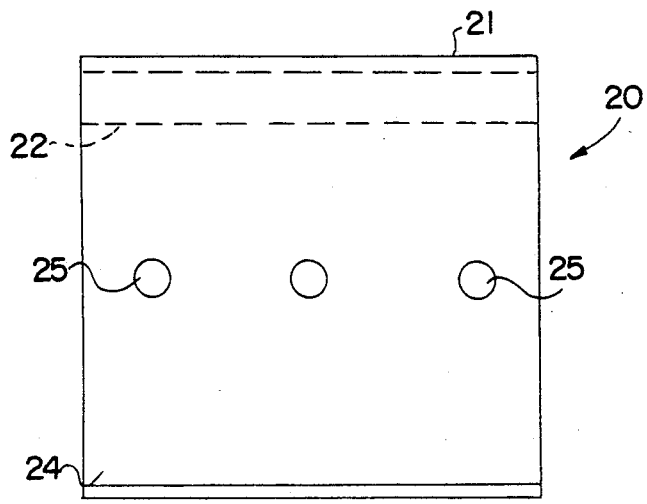
FIG. 2 is a front view of a hanger bracket, according to one preferred embodiment of this invention.
Figure 3:
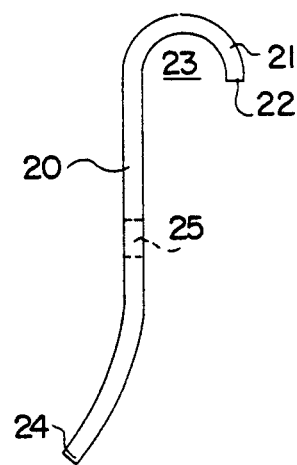
FIG. 3 is a side view of the hanger bracket as shown in FIG. 2.

FIGS. 1 and 1A each show a rear perspective view of knife assembly 15, according to two different preferred embodiments of this invention. Knife assembly 1 comprises hanger bracket 20 that forms curved end 21. It is apparent that hanger bracket 20, except for curved end 21, can have either a generally planar shape, or an overall curved shape. FIGS. 1-3 show hanger bracket 20 having a generally curved overall shape. Such curved overall shape is preferably directed opposite from the curve of curved end 21. However, it is apparent that hanger bracket 20 can have either a straight end 21 or an end 21 which is curved opposite from the curve direction shown in FIGS. 1, 1A and 3.

Figure 8:
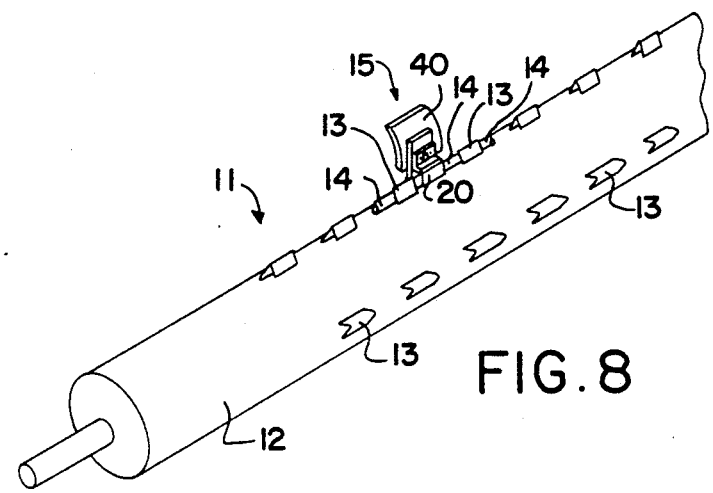
FIG. 8 is a perspective view of a rotor, hanger rod and knife assembly, according to one preferred embodiment of this invention.

As clearly shown in FIG. 3, curved end 21 defines hanger bracket opening 23 which is large enough or open enough to fit over hanger rod 14, as shown in FIG. 8. In a mounted position of knife assembly 15, with respect to rotor assembly 11 as shown in FIG. 8, hanger rod 14 is mounted within hanger bracket opening 23. There is preferably enough clearance between the inside bearing surface of curved end 21 and the outside surface of hanger rod 14 to allow knife assembly 15 to swing or pivot about a longitudinal axis of hanger rod 14.

Figure 6:
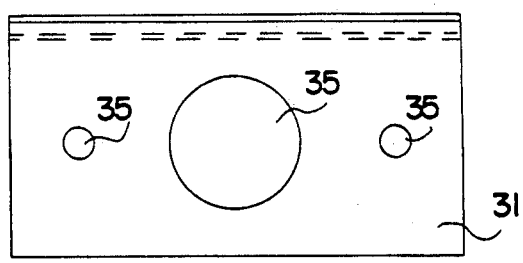
FIG. 6 is a rear view of a retaining bracket, according to one preferred embodiment of this invention.
Figure 7:
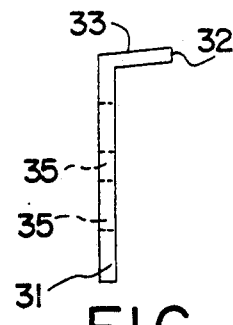
FIG. 7 is a side view of the retaining bracket, as shown in FIG. 6.
Figure 6A:
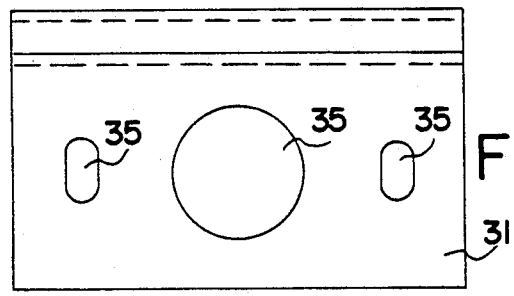
FIG. 6A is a rear view of a retaining bracket, according to another preferred embodiment of this invention.
Figure 7A:
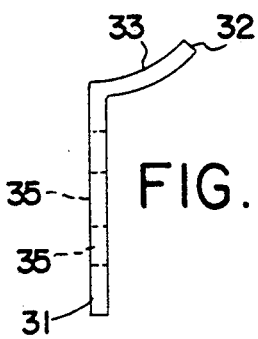
FIG. 7A is a side view of the retaining bracket, as shown in FIG. 6A.

In one preferred embodiment according to this invention as shown in FIGS. 1, 6 and 7, retaining bracket 30 preferably has an overall L-shaped cross section. Retaining bracket 30 is positioned adjacent hanger bracket 20 and close enough to curved end 21 to enclose and retain hanger rod 14 within hanger bracket opening 23. Retaining bracket 30 preferably comprises mounting portion 31, which when assembled is secured adjacent hanger bracket 20, and bearing portion 33 which is angled, with respect to mounting portion 31, away from hanger bracket 20. As shown in FIGS. 1, 6 and 7, bearing portion 33 is approximately perpendicular to mounting portion 31. However, it is apparent that the relative angle between bearing portion 33 and mounting portion 31 can be varied and still accomplish the result of retaining hanger rod 14 within hanger bracket opening 23. It is also apparent that other types and shapes of brackets can be used in lieu of retaining bracket 30, as shown in FIGS. 1, 6 and 7. For example, in another preferred embodiment of this invention as shown in FIGS. 6A and 7A, bearing portion 33 is curved to conform to the outside surface of hanger rod 14.

In one preferred embodiment according to this invention, knife blade 40 is either fixedly secured or detachably secured to hanger bracket 20. In another preferred embodiment of this invention, as shown in FIG. 1A, hanger bracket 20 and the knife blade form an integral piece. It is apparent that if knife blade 40 is detachably secured to hanger bracket 20, as shown in FIG. 1, then knife blade 40 is easier to remove for maintenance or replacement purposes. Retaining bracket 30 is also detachably secured to hanger bracket 20. As shown in FIG. 1, knife blade 40 is positioned on a front side of hanger bracket 20 while retaining bracket 30 is positioned on an opposite or rear side of hanger bracket 20. As shown in FIG. 1A, hanger bracket 20 and the knife blade form an integral piece, and retaining bracket 30 is positioned on the rear side of hanger bracket 20. It is apparent that other ordered positions or arrangements of hanger bracket 20, retaining bracket 30 and knife blade 40 can be used to accomplish the same result of this invention. However, the arrangements shown in FIGS. 1 and 1A are preferred. The arrangement shown in FIG. 1 is particularly suitable for applications which require a durable knife assembly 15 since retaining bracket 30 and/or knife blade 40 strengthen the overall knife assembly 15.

Figure 4:
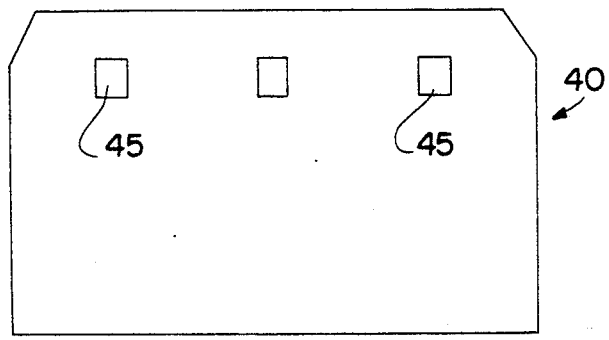
FIG. 4 is a front view of a knife blade, according to one preferred embodiment of this invention.
Figure 5:
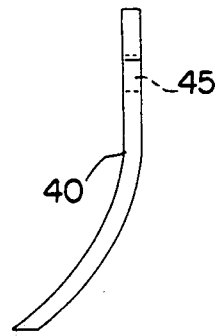
FIG. 5 is a side view of the knife blade, as shown in FIG. 4.

As shown in FIG. 2, hanger bracket 20 has a plurality of through holes 25. Likewise, retaining bracket 30 has a plurality of through holes 35, as shown in FIG. 6, and knife blade 40 has a plurality of through holes 45, as shown in FIG. 4. Through holes 25 correspond with both through holes 35 and through holes 45. By the term "correspond", as used throughout the specification and in the claims, it is intended to mean that at least a portion of the through holes of each of hanger bracket 20, retaining bracket 30 and knife blade 40 align so that bolts 42 and nuts 43 can be used to secure hanger bracket 20, retaining bracket 30 and knife blade 40 with respect to each other. In one preferred embodiment according to this invention, bolt 42 is a carriage bolt and depending upon the position of bolt 42, the through hole which corresponds with the non-circular portion of the carriage bolt has an accommodating cross-sectional shape. For example, as shown in FIG. 4, through holes 45 have a square cross section. It is apparent that the through holes can have other non-circular cross-sectional shapes.

Although knife blade 40 and hanger bracket 20 can be permanently secured together or form an integral piece, the detachably secured arrangement between knife blade 40 and hanger bracket 20 enables a damaged knife blade 40 to be easily replaced, particularly without removing hanger bracket 20 from hanger rod 14. It is apparent that conventional knife assemblies can be retrofitted by cutting or grinding the conventional curved end so that it fits over a hanger rod, as described in this specification, and adding a bracket similar to retaining bracket 30 of this invention.

In one preferred embodiment according to this invention, the middle through hole 35 of retaining bracket 30 is enlarged, as clearly shown in FIGS. 6 and 6A, mainly for three reasons. First, such enlargement enables knife blade 40 to be secured to hanger bracket 20 before retaining bracket 30 is secured to hanger bracket 20. Thus, knife blade 40 can be secured or attached to hanger bracket 20 before knife assembly 15 is positioned over hanger rod 14, which is an important aspect of this invention. Once hanger bracket 20 is positioned over hanger rod 14, retaining bracket 30 can then be secured or attached to hanger bracket 20, with the two outside bolts 42 and nuts 43, as shown in FIG. 1. Second, such enlargement enables wrench access to the middle nut 43, also as shown in FIG. 1. Third, an enlarged middle through hole can reduce the weight of retaining bracket 30 and thus the overall weight of knife assembly 15.

In another preferred embodiment according to this invention as shown in FIG. 6A, at least one, preferably two, through holes 35 of retaining bracket 30 form a slot so that retaining bracket 30 can be adjusted, with respect to hanger bracket 20. Although the circular through holes 35 shown in FIG. 6 can be slightly enlarged with respect to the outside diameter of bolt 42 for limited adjustment of retaining bracket 35, slotted through holes 35 can provide more adjustment. With such adjustment capabilities, a desired space or opening can be formed between end edge 22 of curved end 21 and end edge 32 of mounting portion 31. Such spacing can be adjusted to accommodate foreign material removal, such as dirt removal, from within hanger bracket opening 23 or the space defined between the outside surface of hanger rod 14 and the inside bearing surface of curved end 21.

In one preferred embodiment according to this invention, curved end 21 forms a curve about an arc segment of approximately 180°. It is apparent that such arc segment can extend over a greater or lesser angle, depending upon the outside diameter of hanger rod 14 and the inside diameter of curved end 21. Since curved end 21 is subjected to centrifugal forces during operation, curved end 21 preferably comprises as much material as possible, for strength of materials reasons, and thus preferably extends as far as possible about the arc segment. Regardless of the dimensions of the arc segment, the outside diameter of hanger rod 14, and the inside diameter of curved end 21, it is an important aspect of this invention for curved end 21 to fit over hanger rod 14 and for retaining bracket 30 to enclose hanger rod 14 within bracket opening 23, when in an assembled position. In another preferred embodiment according to this invention, knife blade 40 is curved to conform with the overall shape of hanger bracket 20, particularly with the shape of knife end 24.

Referring to FIG. 8, rotor assembly 11, which is an element of a flail apparatus according to this invention, comprises rotor 12. The flail apparatus is used, for example, for mowing or shredding agricultural crop residue, for industrial and commercial mowing, and for mowing right-of-ways, roadsides, orchards, parks and the like. Rotor 12 is rotatably mounted to a structural frame of the flail apparatus. In one preferred embodiment according to this invention, at least two retainer brackets 13 are secured, preferably welded, to rotor 12 so that hanger rod 14 can be mounted within retainer brackets 13. In another preferred embodiment according to this invention, a multiplicity of retainer brackets 13 are used so that one retainer bracket 13 can be secured on both sides of each knife assembly 15, and so that each knife assembly 15 maintains a longitudinal position with respect to rotor 12. In a preferred rotor assembly 11 according to this invention, a plurality of hanger rods 14 are secured to rotor 12 and the retainer brackets 13 and knife elements 15 alternate positions on each consecutive hanger rod 14. For clarity purposes, FIG. 8 shows only one knife element 15 in a mounted position and only a portion of hanger rod 14. It is apparent that the remaining knife elements 15 are similarly mounted.

While in the forgoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of this invention.

I claim:
1. A detachable knife assembly comprising:
a hanger bracket forming a curved end and a knife end, said curved end defining a hanger bracket opening large enough to fit over a hanger rod;
a retaining bracket, a mounting portion of said retaining bracket positioned adjacent said hanger bracket, a bearing portion of said retaining bracket angled with respect to said mounting portion away from said hanger bracket, an outer edge of said bearing portion spaced from an edge of said curved end, said retaining bracket positioned adjacent said hanger bracket and close enough to said curved end to enclose and retain the hanger rod within said hanger bracket opening; and attachment means for detachably securing said retaining bracket to said hanger bracket.

2. A detachable knife assembly according to claim 1 wherein said curved end forms a curve about an arc segment of approximately 180°.

3. A detachable knife assembly according to claim 1 further comprising a knife blade secured to said hanger bracket.

4. A knife assembly according to claim 3 wherein said knife blade is detachably secured to said hanger bracket.

5. A knife assembly according to claim 3 wherein said attachment means further comprise: said hanger bracket, said knife blade and said retaining bracket each having a plurality of corresponding through holes, a plurality of bolts each mounted through one of said corresponding through holes, and a plurality of nuts matingly engageable with corresponding said bolts.

6. A knife assembly according to claim 5 wherein each said bolt is a carriage bolt.

7. A knife assembly according to claim 5 wherein at least one said through hole of said retaining bracket is enlarged for wrench access to the corresponding said bolt.

8. A knife assembly according to claim 5 wherein at least one of said through holes is shaped as a slot for adjusting a position of said retaining bracket with respect to said hanger bracket.

9. In a knife assembly having a hanger bracket forming a curved end and a knife element, the improvement comprising:

the curved end defining a hanger bracket opening large enough to fit over a hanger rod, a retaining bracket, a mounting portion of said retaining bracket positioned adjacent the hanger bracket, a bearing portion of the retaining bracket angled with respect to said mounting portion away from said hanger bracket, an outer edge of said bearing portion spaced from an edge of the curved end, said retaining bracket positioned adjacent said hanger bracket and close enough to the curved end to enclose and retain the hanger rod within said hanger bracket opening, and attachment means for detachably securing said retaining bracket to the hanger bracket.

10. In a knife assembly according to claim 9 wherein the curved end forms a curve about an arc segment of approximately 180°.

11. In a knife assembly according to claim 9 wherein said knife element further comprises a knife blade secured to said hanger bracket.

12. In a knife assembly according to claim 11 wherein said knife blade is detachably secured to said hanger bracket.

13. In a knife assembly according to claim 11 wherein said attachment means further comprise: the hanger bracket, said knife blade and said retaining bracket each having a plurality of corresponding through holes, a plurality of bolts each mounted through one of said corresponding through holes, and a plurality of nuts matingly engageable with corresponding said bolts.

14. In a knife assembly according to claim 13 wherein each said bolt is a carriage bolt.

15. In a knife assembly according to claim 13 wherein at least one said through hole of said retaining bracket is enlarged for wrench access to the corresponding said bolt.

16. In a knife assembly according to claim 13 wherein at least one of said through holes is shaped as a slot for adjusting a position of said retaining bracket with respect to said hanger bracket.

17. A rotor assembly for a shredder, the rotor assembly comprising:

a rotor, a plurality of hanger rods, mounting means for mounting each said hanger rod on said rotor, a plurality of knife assemblies; and each said knife assembly comprising a hanger bracket forming a curved end and a knife end, said curved end defining a hanger bracket opening large enough to fit over one of said hanger rods, a retaining bracket, a mounting portion of said retaining bracket positioned adjacent said hanger bracket, a bearing portion of said retaining bracket angled with respect to said mounting portion away from said hanger bracket, an outer edge of said bearing portion spaced from an edge of said curved end, said retaining bracket positioned adjacent said hanger bracket and close enough to said curved end to enclose and retain said one of said hanger rods within said hanger bracket opening; attachment means for detachably securing said retaining bracket to said hanger bracket.

18. A rotor assembly according to claim 17 wherein said mounting means further comprise a plurality of retainer brackets secured to said rotor, each said retainer bracket forming an opening through which a corresponding said hanger rod is mounted.

19. A rotor assembly according to claim 17 wherein each said knife assembly further comprises a knife blade secured to said hanger bracket.

20. A rotor assembly according to claim 17 wherein said knife blade is detachably secured to said hanger bracket.

21. A rotor assembly according to claim 19 wherein said attachment means comprise: each said hanger bracket, each said knife blade and each said retaining bracket each having a plurality of corresponding through holes, a plurality of bolts each mounted through one of said corresponding through holes, and a plurality of nuts matingly engageable with corresponding said bolts.

22. A rotor assembly according to claim 21 wherein at least one said through hole of each said retaining bracket is enlarged for wrench access to the corresponding said bolt.

23. A rotor assembly according to claim 21 wherein at least one of said through holes is shaped as a slot for adjusting a position of each said retaining bracket with respect to said hanger bracket.

* * * * *